May 14, 1935.　　　　　　　　　　　　　　　　　　　　2,001,292
A. G. VON SODEN-FRAUNHOFEN ET AL
CLUTCH DEVICE FOR MOTOR VEHICLES
Filed Feb. 16, 1933　　　　2 Sheets-Sheet 1

Inventors:

May 14, 1935.  A. G. VON SODEN-FRAUNHOFEN ET AL  2,001,292
CLUTCH DEVICE FOR MOTOR VEHICLES
Filed Feb. 16, 1933   2 Sheets-Sheet 2

Patented May 14, 1935

2,001,292

UNITED STATES PATENT OFFICE 2,001,292

CLUTCH DEVICE FOR MOTOR VEHICLES

Alfred Graf von Soden-Fraunhofen and Albert Maier, Friedrichshafen, Germany, assignors to Zahnradfabrik Friedrichshafen Aktiengesellschaft, Friedrichshafen, Germany Application February 16, 1933, Serial No. 657,007
In Germany February 26, 1932

2 Claims. (Cl. 192—67)

Our invention relates to free-wheel devices in motor vehicles. Such devices generally are inserted in the propeller shaft of the vehicle between the gear box and the rear axle transmission.

Lately it has been proposed to provide such free-wheel devices with means for blocking the free-wheeling mechanism at will, especially in cases in which the driver wants a driving connection from the wheels of the vehicle backwards to the motor for the purpose of exerting braking forces.

For such blocking of the free-wheeling mechanism a claw coupling may be provided. The difficulty connected therewith is a smooth and shockless operation of such coupling.

According to our invention we provide means by which the operation of the clutch is prepared but not perfected before the two coupling halves have come to substantially equal speed of rotation. For this purpose the operating lever for the claw coupling has a resiliently situated more or less wedge-shaped member adapted to co-operate with an adequately shaped member rigidly fixed to the arm for shifting one of the claw coupling halves into or out of engagement with the second coupling half.

We prefer to make the arrangement so that only the shifting of the claw coupling halves into engagement is delayed and afterwards perfected automatically when the two coupling halves have come to substantially equal speed of rotation, whereas the dis-engagement of the coupling goes simultaneously with the adequate operation of the operating lever. If so desired, this latter operation may be perfected in the same manner as the engagement of the coupling halves, that is, with preparation and later automatic operation after the transmitting force between the two halves has adequately decreased.

All this will be understood best when having reference to the drawings which represent two examples embodying our invention.

Figure 1:
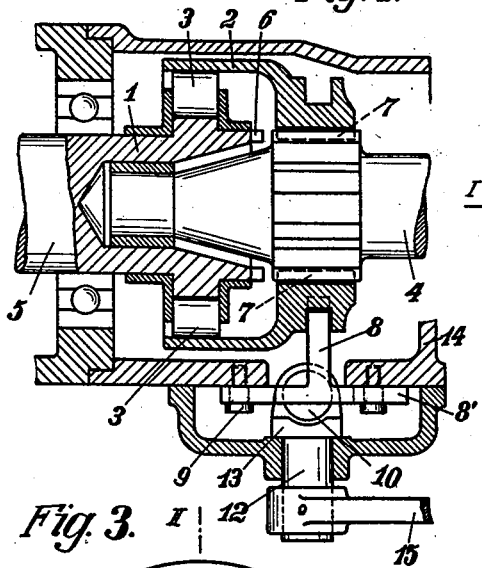
Figs. 1 and 2 are longitudinal vertical sections through a free-wheel device connected with a claw coupling, giving two different positions.

The free-wheel mechanism comprises an inner member 1 formed integral with the first shaft 5, and an outer member 2 splined to the second shaft 4. Between both members rollers 3 are provided. Member 1 at its circumference is shaped step like, as is usual with unidirectional driving devices. Furthermore, member 1 at its front face has projecting claws 6 adapted to engage with the claws 7 of member 2. These claws may be shaped in any well-known manner.

Member 2 can be shifted axially by means of fork-like element 8. Integral with this element 8 there is a plate 8' having two slits 8'' into which screw bolts 9 extend serving as guiding means.

Operating lever 15 is journaled on pin 12. It has an arm 13. In this arm a spring 11 is situated which presses on a member 10. The plate 8' at its lower rim opposite to member 10 has one or two recesses.

Figure 5:
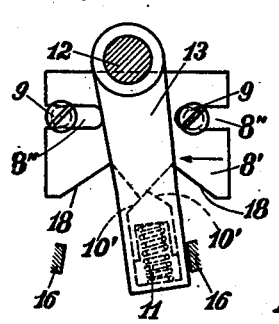
Figs. 5 and 6 represent details of Fig. 4 in different positions.
Figure 4:
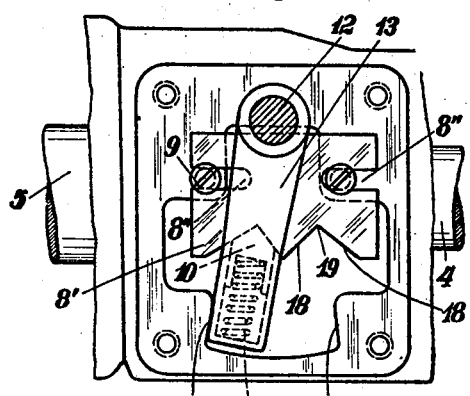
Fig. 4 is a side-view of one modification of the invention, with the outer casing being removed.
Figure 6:
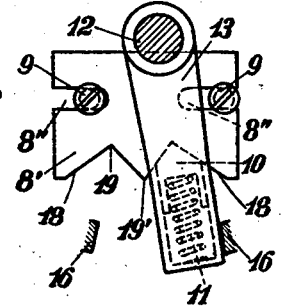

In the first example, represented in Figs. 4, 5 and 6, member 10 has a double wedge shape, and plate 8' has two recesses into each of which member 10 fits. The recesses have sloping side faces 18 and an angle point 19. The side faces 10' of member 10 correspond to the side faces 18 of the recesses. There are stops 16 for the swinging movement of arm 13.

Figure 7:
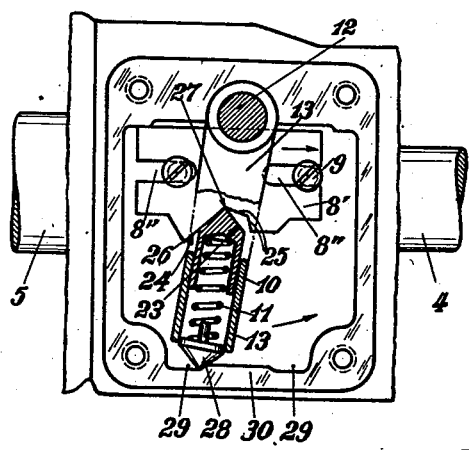
Fig. 7 is a side-view of another modification, partly in section.
Figure 8:
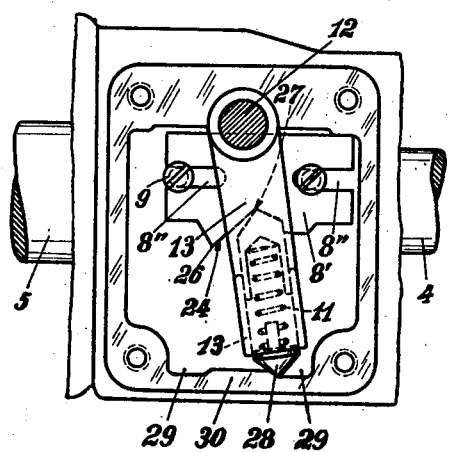
Figs. 8 and 9 correspond to Fig. 7 but show different positions of the members of the mechanism.
Figure 9:
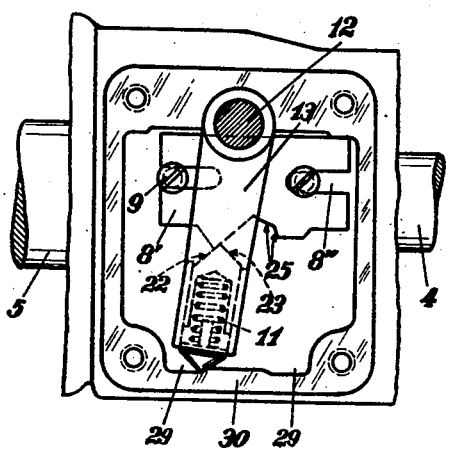

In the second example, represented in Figs. 7, 8 and 9, the shape of member 10 and of the corresponding recess in plate 8' is different from that in the first mentioned example. The angles of inclination of the side faces 22 and 23 are different from each other and consequently the recess also has two different side faces 26 and 25.

Furthermore, in the second example there is an element 28 against which spring 11 bears also and which presses against frame 30 having a left hand and a right hand rest position 29.

Figure 2:
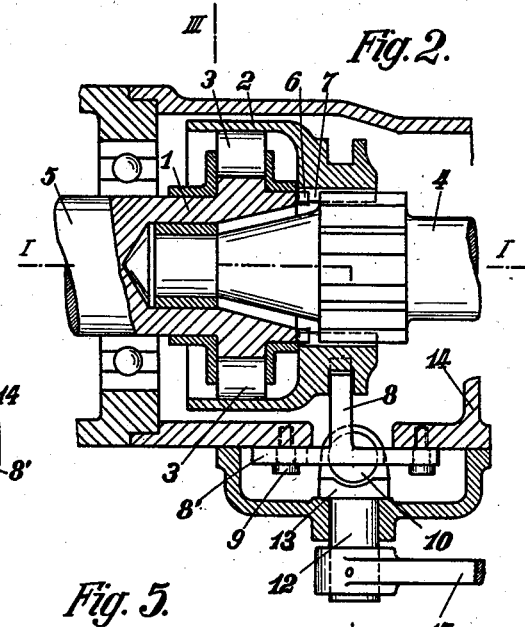
Figure 3:
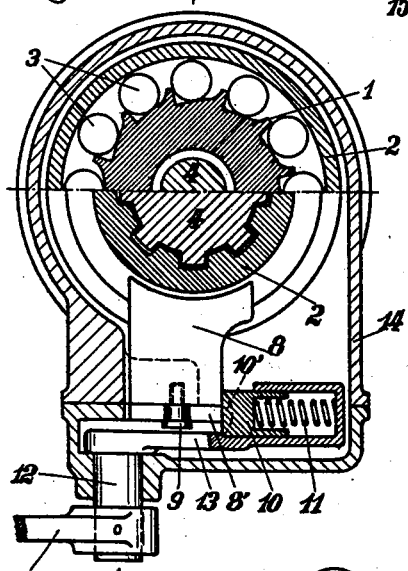
Fig. 3 is a corresponding cross section taken on line III—III of Fig. 2.

The operation of the entire mechanism is as follows:

In Fig. 4, corresponding to Fig. 1, the device is represented in the free-wheeling position with the claw coupling 6/7 being dis-engaged and plate 8' being in its right hand position. If lever 15 is moved to the left, which means that arm 13 is moved to the right, member 10 at the same time slides along the right hand side face of the left hand recess of plate 8' into the position shown in Fig. 5, in which it presses against the left hand side face of the right hand recess, tending to shift plate 8' together with member 8 and member 2 into their left hand positions, thus causing engagement between members 2 and 1 by means of claws 7 and 6. This engagement will occur automatically under the pressure of spring 11 as soon as the resistance preventing such engagement vanishes, that is when the two coupling members have come to substantially equal speed of rotation. Then the elements concerned will take the positions represented in Figs. 6 and 2.

When releasing the clutch again the operation is analogous by swinging lever 15 back into its left hand position. It is assumed that this need not be explained again in detail.

In the example represented in Figs. 7, 8 and 9, the operation for coupling members 1 and 2 corresponds to the adequate operation in the first example:

From the free-wheeling position shown in Fig. 8 arm 13 is moved into the position shown in Fig. 9 thus tensioning plate 8' towards the left, spring 11 causing this movement as soon as the resisting circumstances allow. The positions then attained are represented in Fig. 7.

If arm 13, out of this latter position, is moved back into the position shown in Fig. 8, the right hand side face of member 10 bears against the side face 25 of the recess in plate 8' and causes this plate together with member 8 and member 2 to be moved to the right and thus to dis-engage coupling 6/7 immediately with the operation of lever 15, because of the broken line shape of side face 25.

Our new design of free-wheel devices has the aforementioned advantages, and besides it allows for a very simple and compact construction of the entire mechanism, as may be seen from the drawings.

We do not want to be limited to the details described or shown in the drawings as many variations will occur to those skilled in the art.

What we claim is:

1. A device for shifting one positive clutch member into and out of engagement with another comprising: a member in operative connection with said first clutch member, a wedge-shaped element adapted to co-operate with said member, a spring pressing against said element and adapted to force said member into one of its end positions, said member having an unsymmetrical notch, one side thereof being smooth the other one having a broken side face.

2. A device as claimed in claim 1 further including means for resiliently holding said wedge-shaped element and said member alternately in one of their common end positions.

ALFRED GRAF v.
    SODEN-FRAUNHOFEN.
ALBERT MAIER.